March 29, 1938.  H. J. GRAHAM ET AL  2,112,526

VEHICLE SIGNAL ARM

Filed Sept. 24, 1934

Inventor
HERBERT J. GRAHAM
HARRY YALE MAGEOCH
By Leon Edelson
Attorney.

Patented Mar. 29, 1938

2,112,526

UNITED STATES PATENT OFFICE 2,112,526

VEHICLE SIGNAL ARM

Herbert J. Graham and Harry Yale Mageoch, Philadelphia, Pa., assignors to Electric Service Supplies Company, Philadelphia, Pa., a corporation of Pennsylvania Application September 24, 1934, Serial No. 745,228

3 Claims. (Cl. 116—54)

This invention relates to electrically illuminated signal devices and more particularly to improvements in the design and construction of semaphore arms formed of translucent material.

In our co-pending application, Serial No. 745,229 filed September 24, 1934, there has been disclosed a directional signal unit wherein an electromagnetically operated mechanism is employed for actuating a semaphore arm to indicate the direction in which a vehicle equipped with the signal unit is about to turn. The semaphore arm employed in that unit is described as comprising a pivotally mounted metallic arm upon which is adapted to be supported in longitudinally extending relation a translucent signal element. The present invention is more particularly directed to the design and construction of this latter element.

Heretofore and prior to this invention, directional signal units for motor vehicles and the like having signal elements in the form of hollow, substantially arrow-shaped shells of translucent material have been employed. These signal elements have usually been provided with substantially parallel sides, each of these sides being of generally spear shape. In certain instances, metallic frames have been employed in the opposite sides of which are mounted translucent spear-shaped windows of celluloid or other such composition material arranged in substantially parallel relation, and in such constructions, the signal shells have been provided at their outer extremities with opaque end enclosures substantially equalling in width the distance between the side walls, this being a necessary incident to the provision of the parallel side walls. Also, in certain prior constructions of which we are aware, the outer end enclosures of the signal shells are in the form of opaque metal bands which serve to hold the outer extremities of the side walls of the shell in spaced relation.

Due to the construction of the present type of automobile lamp now in general use, its location has been perforce restricted to a point in the base, that is, adjacent the inner extremity, of the signal shell. Attempts to move the lamp toward the center or outer extremity of the shell have invariably proved unsuccessful, this being due to the fact that the lamp casts a shadow upon the translucent side walls of the shell over a distance extending rearwardly of the lamp filament. Thus, while the intensity of illumination at the center and toward the outer extremity of the translucent shell may be increased by shifting the lamp forwardly, the effective illuminated area in each side wall of the shell is very materially decreased by reason of the shadow cast by the lamp base. Also, shifting of the lamp forwardly renders impossible the attainment of a distribution of light of substantialy uniform intensity over the entire extent of the spear-shaped shell. In view of these considerations, it has been found desirable to locate the lamp in the base of the shell, this in spite of the fact that with the lamp so located the intensity of illumination at the pointed outer extremity of the shell is very materially decreased. It will thus be appreciated that regardless of the position of the lamp within the signal shell, so long as the latter is provided with parallel side walls its effectiveness as a direction indicator is very materially reduced.

It is among the objects of the present invention to obviate and overcome the above noted difficulties by the provision of a self-supporting hollow-shell of translucent material, such as celluloid or the like, of such design and shape that with the lamp located in the base thereof the side walls are nevertheless illuminated with a greater intensity and with a greater uniformity than has been obtained heretofore.

A further object of the invention is to provide a self-sustaining shell of celluloid or like translucent composition having an outline of generally spear shape, the side walls thereof being so convergent toward their outer extremities that the loss of light flux in the outer end of the shell is reduced to practically an irreducible minimum, thus insuring a maximum degree of light distribution throughout the entire area of the illuminated side walls of the signal shell.

Still another object of the invention is to still further increase the effectiveness of the illuminated signal shell by so masking the opposite side walls thereof that the increased intensity obtained by the convergent side walls is utilized to make clearly visible and distinguishable, even at a considerable distance from the signal, a plainly defined direction indicating arrow, the optical illusion attending the illumination of the masked side wall of the signal shell, when viewed from a distance, having the effect of making the head and the shaft of the arrow appear to be of equal intensity, thus insuring an effective direction indicator.

Other objects and advantages of the invention will be apparent more fully hereinafter, it being understood that the invention consists in the combination, construction, location and relative arrangement of parts as described hereinafter, as shown in the accompanying drawing, and as finally pointed out in the appended claims.

In the said accompanying drawing:—

Figure 8:
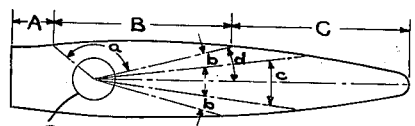
Figure 1:
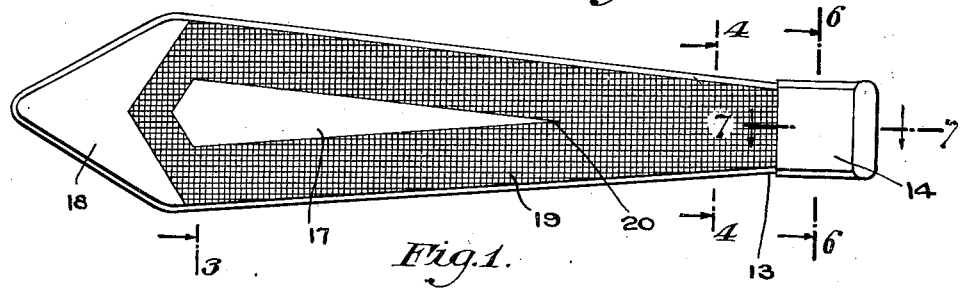
Figure 1 is a side elevational view of the signal shell of the present invention the shading representing the masked area thereof.
Figure 2:
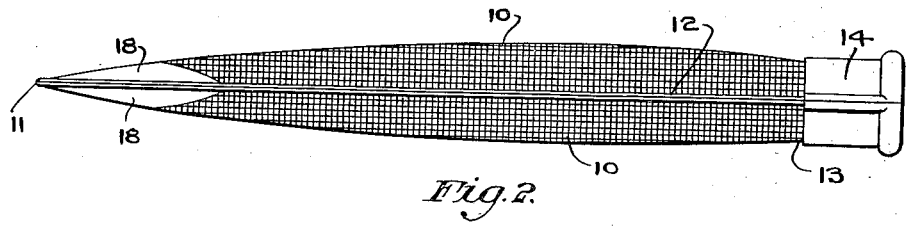
Figure 2 is an edge elevational view thereof.
Figures 3, 4:
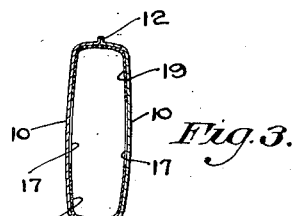
Figures 6, 7:
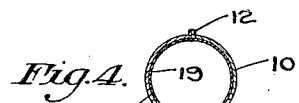
Figure 5:
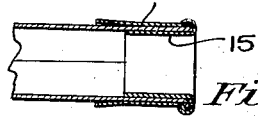
Figure 9:

Figures 3 and 4 are transverse sectional views taken respectively on the lines 3—3 and 4—4 of Figure 1;

Figure 5 is a view showing the masked interior of one side wall of the shell;

Figures 6 and 7 are transverse sectional views taken respectively on the lines 6—6 and 7—7 of Figure 1;

Figure 8 is a diagrammatic view showing the light distribution in the signal shell having the convergent side walls of the present invention; and Figure 9 is a view showing the arrow effect obtained upon viewing the illuminated shell of the present invention.

Referring now to the drawing and more particularly to Figure 8 thereof, it will be appreciated that it is essential to provide for an increased distribution of light flux over the area C of the shell side wall. This is accomplished by the present invention in the manner diagrammatically illustrated in Figure 8 wherein it will be observed that the light shell is provided with side walls which are convergent with respect to each other so that they meet at the outer or pointed extremity of the shell. In the shell having these outwardly converging side walls, the light flux included within the angle c is not wasted but instead is utilized to illuminate a substantial area of the shell side walls. Thus, the area C, is, in the shell of Figure 8, illuminated by the light flux included within the angle d (equal to angle b plus one-half of angle c). The intensity of the illumination over the area C is thus materially increased to a value more nearly approaching that over the area B which is subtended by the light flux angle a.

Even in the shell of this improved design it has been found that an observer, stationed at a distance from the signal arm, finds it somewhat difficult to determine the direction in which the shell is pointed, this in spite of the fact that the side walls of the shell are of generally spear-shape. In order to afford a very definite direction indicator, we have discovered that by suitably masking the side walls of the shell devised by us, a brightly illuminated arrow effect, such as is shown in Figure 9, is obtained, both the head and tail of which are clearly discernible even at a distance of 100 feet or more to afford a definite indication of direction.

A signal shell constructed in accordance with and embodying the principles of the present invention is shown in Figures 1 to 7, inclusive, wherein it will be observed that the shell essentially comprises a pair of pressed or molded side members 10—10 of celluloid or other such translucent material, each of these members being of generally spear-shaped outline and of such transverse and longitudinal curvature that when assembled together they form a hollow shell the side walls of which longitudinally converge or taper to provide a relatively sharp edge 11 at the outer extremity of the shell. The meeting edges of the members 10—10 are preferably flanged, as at 12, to facilitate the assembly of said members, this assembly being preferably effected by subjecting the flanged perimetral edges of the members 10—10 to heat and pressure so as to integrally unite them together, the united flanges thus forming a rib which serves to reinforce and strengthen the shell.

The open end 13 of the shell is of circular cross-section and is equipped with a metallic double-walled reinforcing collar 14 having the inner and outer walls 15 and 16 between which the circular end 13 of the celluloid shell is firmly clamped. This collar 14 may be provided with any suitable means for securing the shell upon a suitable support therefor, the latter being provided with a lamp socket for maintaining a lamp (not shown) in predeterminedly fixed position within the neck of the shell. Inasmuch as the shell securing means and the lamp-equipped support for the shell form no part of the present invention, no description thereof is deemed necessary in this specification, although the same are described in the copending application to which reference has been made above.

In order to afford a definite and clearly discernible direction indicator when the illuminated signal shell is viewed at night, the opposite side walls of the shell, which as stated above are of translucent material, are masked to render opaque all but the areas 17 and 18 thereof. This masking may be effected in any suitable manner, preferably by applying an opaque coating preparation to the inner surface of each side member 10 of the shell, as represented by the shaded areas 19. Or, if desired, this opaque coating 19 may be applied over the external surfaces of the panels 10—10, in which event the preparation so applied should be water proof and otherwise not easily subject to the deleterious influences of rain, dust and the like. Or, the opaque portions of the shell may be fashioned out of thin sheet metal, the remaining portions, such as 17 and 18, being of celluloid or like translucent material. Still another method of masking which may be employed is to superimpose upon each of the inner or outer surfaces of the panels 10—10 a film or sheet of opaque material, either metal or otherwise, suitably formed to leave exposed the areas 17 and 18 in each panel of the shell. In those instances wherein the opaque material is applied over the external surfaces of the shell, the latter need not necessarily be formed of two opposite side panels but instead may be molded or otherwise fashioned in the form of a one-piece hollow shell characterized, of course, by the fact that its opposite sides are longitudinally convergent toward the outer extremity of the shell.

In a shell thus provided with the longitudinally convergent side panels 10—10 each of which is masked as described above, there is clearly discernible to an observer, when the shell is illuminated, the definite outline of an arrow such as is illustrated in Figure 9, it being understood that when the illuminated shell is viewed at night from a distance all that is seen by the observer is the arrow, thus affording him a definite indication of direction. In this connection, it will be observed that the unmasked and therefore translucent area 17 of the shell is of gradually decreasing depth toward its rear end 20, this being a quite important feature of the masking design because the intensity of illumination being of greatest value in the section of the shell encompassing the rear half of the exposed area 17 thereof (compare B of Figure 8), an optical illusion results which makes it appear to the observer that the shaft of the arrow is of uniform depth and intensity throughout. In other words, the intensity of illumination in the immediate vicinity of the light source is reduced to a value comparing favorably to that in the head 18 of the arrow, thus eliminating a chief cause of distortion in the shape of the direction indicating arrow.

What is claimed as new and useful is:—

1. In a signal shell, in combination, a substantially rigid self-sustaining hollow body having opposed side walls of generally spear-shaped perimetral outline adapted to receive a light source within the interior thereof adjacent its inner extremity, said walls being respectively curved transversely and longitudinally whereby the body is of gradually diminishing thickness toward its outer end and marginal edges for substantially equalizing the distribution of light emanating from said light source over the entire inner surface of each opposed side wall of said body and utilizing substantially all of the light rays included within a light flux angle the bisector of which intersects the light source and lies in the median plane of said hollow body, said walls being masked to render translucent only the pointed extremity of the body and elongated central parts of the opposite walls thereof, said translucent central parts being so spaced from the translucent extremity of the body and of such tapered shape that, when the shell is illuminated and viewed from a distance, the optical illusion is obtained of an arrow having a shaft of uniform width and a definitely discernible direction-indicating head.

2. A signal shell comprising, in combination, a substantially rigid self-sustaining hollow body of generally spear-shaped perimetral outline, the inner extremity of said body being of substantially annular cross-section for accommodating a light source therewithin, the opposite side walls of said body being longitudinally and transversely curved for convergence respectively toward the outer extremity and marginal edges of said body for equalizing the distribution of light over the inner surfaces of said side walls, and means for rendering predetermined areas of the opposite side walls of the body transmissible to light whereby to present the effect of an illuminated directional arrow, the head of said arrow being illuminated by light rays included within a light flux angle, the bisector of which lies in the median plane of said body, said means including light intercepting masks of such character as to render transmissible to light only the outer extremities and elongated central parts of the body side walls, said light-transmissible extremities and parts being relatively so spaced and of such shape that, when the shell is illuminated and viewed from a distance, the optical illusion is obtained of an arrow having a shaft of uniform width and a definitely discernible direction-indicating head.

3. A signal shell in the form of a substantially rigid self-supporting elongated hollow body open at one end and closed at the opposite end thereof and adapted to receive a light source within the open end thereof and characterized in that the opposed side walls thereof are each transversely and longitudinally curved so that the perimetral edges thereof converge substantially in the median plane of the body, each of said side walls being masked to render the same opaque except for a substantially triangular area immediately adjoining the outer extremity thereof and a longitudinally tapered area spaced rearwardly of said triangular area and extending longitudinally of the body, said spaced areas being of light-transmitting character so that when light rays are projected therethrough from said light source the said areas conjointly present the effect of an illuminated directional arrow, all points of said areas having substantially the same intensity of illumination due to the convergent character of the side walls of the body adjacent the closed end thereof and the utilization of substantially all of the light rays included within a light flux angle, the bisector of which lies in the median plane of the body.

HERBERT J. GRAHAM.
HARRY YALE MAGEOCH.